USOO5468277A

United States Patent [19]
Rehbein et al.

[11] Patent Number: 5,468,277
[45] Date of Patent: Nov. 21, 1995

[54] COAL COMBUSTION FLY ASH SOIL AMENDMENT

[75] Inventors: Gerald L. Rehbein, White Bear Lake; Paul D. Montain, Lino Lakes, both of Minn.

[73] Assignee: Rehbein, Inc., Centerville, Minn.

[21] Appl. No.: 304,523

[22] Filed: Sep. 12, 1994

[51] Int. Cl.$^6$ ............................... C05D 3/02; C05D 3/04; C05D 9/00

[52] U.S. Cl. .......................... 71/24; 71/25; 71/62; 71/63; 71/903; 106/706; 588/258

[58] Field of Search .................................. 71/24, 25, 903, 71/61–63; 106/85, 97; 210/751, 764; 588/258

[56] References Cited

U.S. PATENT DOCUMENTS

| | | | |
|---|---|---|---|
| 4,028,130 | 6/1977 | Webster et al. | 106/697 |
| 4,354,876 | 10/1982 | Webster | 106/611 |
| 5,277,826 | 1/1994 | Burns et al. | 210/751 |

OTHER PUBLICATIONS

Adriano, D. C. et al., "Utilization of Fly Ash and Other Coal Residues in Terrestrial Ecosystems: A Review," in Journal of Environmental Quality, 1980, 9:333–344. (No month).

Walker, W. J. et al., "Elemental Composition of Barley and Ryegrass Grown on Acid Soils Amended With Scrubber Sludge," *Journal of Environmental Quality*, 1980, 9:27–30 (No month).

Ransome, L. S. et al., "Soybean Growth and Boron Distribution in a Sandy Soil Amended with Scrubber Sludge," *Journal of Environmental Quality*, 1987, 16:171–175 (No month).

Mattigod, S. V. et al., "Geochemical Factors Controlling the Mobilization of Inorganic Constituents from Fossil Fuel Combustion Residues: I. Review of the Major Elements," *Journal of Environmental Quality*, 1990, 19:188–201 (no month).

Early, L. E. et al., "Geochemical Factors Controlling the Mobilization of Inorganic Constituents from Fossil Fuel Combustion Residues: II. Review of the Minor Elements," *Journal of Environmental Quality*, 1990, 19:202–214 (no month).

*Primary Examiner*—Ferris Lander
*Attorney, Agent, or Firm*—Robert C. Baker; Jeffrey A. Proehl

[57] ABSTRACT

This agricultural field utilization of tonnage quantities of a composite powder of coal combustion fly ash containing desulfurization residue prevents the escape of fugitive dust from the powder and effectively manages any cementitious tendencies of the powder, while raising the pH of the soil and adding plant nutrient elements to the soil. The powder is added to water at a weight ratio of 10:8–20 in an enclosed tank having a capacity of at least about 2,000 gallons. Mixing is conducted for at least about 5 minutes to form a soil treatment slurry composition easily flowable through a pipe of about 1-inch diameter. The treatment composition is applied on the agricultural soil before the composition hardens to a cementitious state, preferably by spraying directly from the mixing tank. The coating thickness is sufficient to amend just the top portion of the agricultural soil that supports plant growth, to elevate the pH above about 6.5 and not elevate the total plant-available boron above about 25 pounds per acre. The applied composition is worked into the top portion of the soil either before or after the composition has hardened to any cementitious state.

23 Claims, 1 Drawing Sheet

COAL COMBUSTION FLY ASH SOIL AMENDMENT

BACKGROUND OF THE INVENTION

This invention relates to a method of utilizing a composite powder of coal combustion fly ash containing desulfurization residue to amend agricultural soil. More particularly, this invention relates to the conduct of such a method in a manner that not only prevents the escape of fugitive dust from the powder but also effectively manages any cementitious tendencies of the powder.

The combustion of coal to generate electrical power at utility plants has become more and more widespread and produces huge quantities of fly ash particles as well as noxious sulfur-containing gases that would escape to the atmosphere if not specially removed and collected. Removal or trapping of the sulfur gases is accomplished by desulfurization techniques that rely on reacting the sulfur of the gases with calcium compounds to form an easily collectable solidified residue containing, for example, calcium sulfate. This sulfur-containing residue and any excess calcium compound are collected with the fly ash from the flue gases of combustion as a composite powder. Most of this powder (i.e., fly ash containing desulfurization residue) is presently being disposed of in landfills, but landfilling the considerable amounts generated (e.g., 250,000 U.S. tons or more per year from a single electrical power plant) is burdensome and expensive and considered objectionable.

The calcium-enriched fly ash composite powder has been shown in pot studies or on small test plots to be beneficial as an agricultural soil amendment for raising the pH of acidic soils and for adding beneficial plant nutrients. However, insofar as is known, this ash powder has not seen any significant agricultural utilization as a soil amendment due to the difficulties associated with handling and land applying the tonnage quantities necessary for a meaningful agricultural field utilization of it.

When applied in a dry condition to the surface of a field of agricultural soil, this fly ash powder has proven difficult to manage because the powder's fine, dusty character makes it vulnerable to the problem of "fugitive dust." Fugitive dust is small ash powder particles that are easily blown about by the wind and thus "escape" from powder applied on the soil's surface. The wind-driven fugitive dust is a special problem because it may travel to untreated fields or places not suitable for the ash powder, such as in surface water or residential areas. It also can cause operator discomfort and can clog filtering systems for mechanical equipment.

Injecting the dry ash powder below the surface of the soil has been considered to avoid the dust problem. However, injection would concentrate the ash powder in a relatively small area or "band" within the soil. This is highly significant because some constituents of the ash powder (such as, for example, boron) that are relatively innocuous and even beneficial to plants at lower concentration levels in the soil may reach a toxic level when they are concentrated in a localized area of the soil. Also, the soil pH-raising ability of the powder would be limited to only a small area around the band.

A treatment technique that has been considered is to apply the dry ash powder to the surface of the soil and subsequently turn the ash-covered soil surface over using a plow (e.g., a moldboard plow) to bury the powder. This technique is unsatisfactory because the powder is still vulnerable to fugitive dust during application and until the powder is plowed beneath the surface. Also, if the plowing is done improperly, the powder can end up being concentrated into a strata lying below the soil's surface, which creates problems of potential toxicity and isolated pH-raising effect similar to those arising from injection application.

It has been widely believed that the addition of water to the high calcium fly ash powder to form a composition for application to agricultural soil would create difficulties even more serious than those of dry application because of the widespread tendency of such ashes to exhibit a latently cementitious character. The latently cementitious property has been known to cause hardening or curing of the wetted powder into a solid mass. It is the very property relied upon in Webster's U.S. Pat. No. 4,354,876 in forming compacted solid structural landfills. A major concern has been that the addition of water to the powder would cause it to harden or cure to a set up condition during land spreading operations, and would therefore clog and damage the equipment employed in land spreading the tonnage quantities required for effective amendment of agricultural fields.

These vexing problems have heretofore prevented any significant agricultural field utilization of the composite powder of fly ash containing desulfurization residue, despite the fact that usefulness of the powder as a potential soil amendment has been known for a long time, even decades.

SUMMARY OF THE INVENTION

The invention provides a method of agricultural field utilization of tonnage quantities of a composite powder of coal combustion fly ash containing desulfurization residue to amend agricultural soil of the type having a soil-water pH below 6.5 in a manner that prevents the escape of fugitive dust from the powder and effectively manages any cementitious tendencies of the powder.

The composite powder for the method is a product wherein the desulfurization residue includes at least one of the group consisting of calcium sulfate and hydrates of calcium sulfate, wherein calcium compounds and any compounds of silicon and aluminum as present in the composite powder do not cause a mixture of the powder with an equal weight quantity of water to harden to a cementitious state earlier than about 2 hours after the powder is mixed with the water, wherein the desulfurization residue and one or more of the oxides, hydroxides, and carbonates of elements selected from the group consisting of calcium, magnesium, potassium, and sodium are present in an amount sufficient to cause the composite powder to exhibit a calcium carbonate equivalent liming potential greater than 20, and wherein plant nutrient elements including boron in addition to sulfur and calcium are present at least in part in a form available for plant uptake.

This composite powder is added to water in an enclosed mixing tank having a capacity of at least about 2,000 gallons. The powder is added at a ratio of about 10 parts by weight of the powder to between about 8 and 20 parts by weight of the water.

Mixing of the powder and water together in the mixing tank is conducted for a time in excess of about 5 minutes starting when the powder is first added to the water. The mixing is sufficient to produce a substantially uniform distribution of the powder as discrete particulate in the water so as to form a soil treatment composition in slurry form having a consistency easily flowable through a pipe of about 1-inch diameter.

The treatment composition is applied on the surface of the agricultural soil to be amended before the composition hardens to a cementitious state. Splashing the composition onto the soil is preferred. The application is accomplished so as to provide a substantially uniform coating of the composition on the soil at a thickness no greater than about 6 or 7 millimeters thick. The composition is applied at a quantity such that each acre is covered with composition containing at least about 5 tons of the composite powder up to about 20 tons of the composite powder. The quantity is sufficient to amend the top portion of the agricultural soil that supports plant growth, from the surface thereof down to a depth of at least 4 inches but no more than about 9 inches (preferably a top portion of no more than about 6 inches), to elevate the pH of the top portion above about 6.5 and insufficient to elevate the total plant-available boron content in the top portion above about 25 pounds per acre.

Then the soil is worked sufficiently to distribute (i.e., mix) the applied treatment composition substantially uniformly throughout the top portion so that the composition effectively is made available for elevating the pH of the top portion and so that plant nutrient elements contained in the composition are substantially uniformly distributed in the top portion. The working of the soil is accomplished at any time following application of the treatment composition on the soil, whether before or after the composition on the soil hardens to any cementitious state. Any said hardened cementitious state of the composition as a layer on soil is characterized by the fact that the layer is easily broken up into fragments by working the soil.

Preferably both the mixing of the ash with water and the application or spreading of the resulting mixture on agricultural soil is accomplished using the same tank and moving it over the agricultural field as the mixture is applied to the field.

Other benefits and advantageous features of the invention will be evident as this description proceeds.

DESCRIPTION OF THE PREFERRED EMBODIMENT

1. PRELIMINARY SOIL ANALYSIS

After a field or ground area of agricultural soil is selected for possible amendment according to the teaching of the invention, one of the first concerns is to establish the suitability of the area for treatment consistent with environmental laws and regulations.

An analysis of the soil under consideration for possible amendment is performed to determine at a minimum the soil-water pH level of the soil, and this level in land to be treated should be below 6.5. The soil analysis generally will also include a determination of other factors such as the soil concentration level of selected elements, cation exchange capacity, the buffer index, etc. Well-known procedures are used in conducting the soil analysis and there is no need to repeat those here. One method for determining the approximate amount of lime or liming agents needed to raise the soil-water pH of a particular agricultural field is the SMP buffer test for lime, here incorporated by reference as it is noted in our U.S. patent application Ser. No. 07/644,956, filed Jan. 22, 1991 and expected to issue as U.S. Pat. No. 5,346,527 on Sep. 13, 1994.

Elements that can potentially be toxic to crops or animals feeding on the crops and that are known or believed to be present at elevated levels in the soil (or in the fly ash powder to be used for soil amendment) should be tested for their concentration levels in the soil (and in the ash contemplated for treatment of the soil) in order to determine the suitability of the soil for amendment using the particular tested ash. For example, the plant-available boron content in a soil is usually beneficial to plant growth as an essential micronutrient, but when boron is present in excess of certain levels it may become toxic to some plants and possibly affect their growth. Plant-available boron is boron in a chemical complex that plants will pick up during growth. The soil concentration level at which boron is potentially toxic varies from one plant type to another, and thus some plants are more sensitive to elevated soil boron levels than other plants. The main purpose for determining a soil's boron content is to avoid adding to the soil (through the soil amendment of the invention) additional boron in amounts that will result in the soil boron concentration level reaching a plant toxic level. Plant-available boron levels in the soil above about 25 pounds per acre are usually undesirable, but again this level is dependent upon the boron sensitivity of the particular crop to be grown in the soil. Sometimes the boron level should not exceed 22 or 23 pounds per acre, and sometimes for some crops it should not exceed 15 or 18 or 20 pounds per acre. The soil's plant-available boron level may be determined, for example, by inductively coupled plasma (ICP) emission spectroscopy analysis following hot water-extraction, as described by J. I. Wear in the section on Boron in Methods of Soil Analysis—Part 2, edited by C. A. Black, in Agronomy, Volume 9, pages 1059–1063, here incorporated by reference.

Other elements that sometimes raise possible concerns are sulfur, selenium, molybdenum, and others. Some are considered essential as plant nutrients but may be objectionable if at elevated soil concentration levels. The major concern with sulfur is that it may potentially leach into the ground water. Sulfur concentrations as well as the concentrations of other elements should be managed to comply with governmental regulations as they are changed from time to time.

2. CHARACTERISTICS OF THE COAL COMBUSTION FLY ASH

The combustion of coal, widely used to generate electricity, causes the production of sizable quantities of byproducts that vary in chemical makeup depending upon a variety of factors such as the chemical composition of the coal itself (e.g., lignite, bituminous, sub-bituminous, etc.), the particular combustion process employed, the temperatures and controls employed for the combustion, the techniques used to collect the byproducts, and the chemicals used to collect the byproducts. Still further, the fly ash particulate resulting from coal combustion is almost invariably collected with the residue resulting from the various desulfurization processes used to remove undesirable emissions such as noxious or pollution-causing sulfur gases (e.g., gaseous oxides of sulfur such as $SO_2$ and $SO_3$). The fly ash particles and the desulfurization residue are typically removed together as a composite powder (from the flue gas stream after it has exited the combustion furnace) by physical collectors such as electrostatic precipitators, cyclone separators, various types of fabric filters, etc. The composite ash powder collected by these methods is substantially dry, although a small amount of water, such as up to about 5 percent by weight, might be subsequently added for dust suppression during transport.

The preferred composite ash powder for practice of the invention has a relatively high level of calcium (e.g., at least about 8 percent and preferably more by weight). This relatively high level may result from burning coals having relatively high natural concentrations of calcium or may result from calcium-enriching desulfurization processes. Desulfurization processes may be performed upon combustion gases inside the combustion area or chamber of the furnace or upon flue gases outside of the combustion area.

A suitable composite powder may be produced by a fluidized bed combustor (FBC) type of coal furnace, in which desulfurization is performed essentially inside the furnace's combustion area during or just after the burning of the coal. In FBC furnaces, coal is typically burned in the presence of a sorbent comprised of a high calcium compound, such as limestone (e.g., calcium carbonate), and in the presence of an inert material, such as ash. These finely ground or particulate materials "float" in a stream of rising air as combustion occurs in the chamber. A large portion of the ash and other combustion products is carried out of the chamber and into the flue by the heated combustion gases. Desulfurization in FBC furnaces generally occurs as the calcium carbonate (in the case of a limestone sorbent) is first converted by the heat of combustion into calcium oxide, which then combines with the sulfur in the gases to form a precipitated residue often containing calcium sulfate. Calcium sulfite and calcium sulfide may also be formed, but usually calcium sulfate dominates. The calcium sulfate and other residues (including unreacted calcium compounds) in the collected powder are generally in the form of discrete particles or coatings on the fly ash particles.

Desulfurization processes that act on combustion gases that are exiting or have exited the combustion area may also produce a high calcium composite fly ash powder suitable for this invention. For example, in a dry scrubbing process, a calcium compound (such as lime or limestone) is typically ground up and suspended in a water slurry that is then sprayed in a fine mist into the flue gas stream. The sulfur-containing gases are thus exposed to and reacted with the calcium compounds carried in the sprayed lime slurry. Sulfur compounds such as calcium sulfate precipitate as a substantially dry powder that is removed along with fly ash particles of the flue gas stream.

Of primary concern in the composition of the composite ash powder is the presence of any compounds and mixtures thereof that contribute to the dry powder's overall hardening or possible curing to a cementitious state when it is brought into contact with water. For example, at least three different groups of calcium compounds that may be present in coal fly ash powder can exhibit cementitious properties. The first group that may be present includes calcium compounds that are the same or similar to those compounds that are present in portland cement powders (such as tricalcium silicate, dicalcium silicate, tricalcium aluminate, tricalcium aluminal ferrite, etc.) and that will hydrate and cure in a manner similar to that of portland cement. The second group includes calcium compounds, such as calcium oxide and calcium hydroxide, which alone are not cementitious but are available to react with naturally occurring latently cementitious pozzolanic compounds in the powder upon the addition of water. The pozzolanic compounds generally include siliceous and aluminous compounds, such as silica ($SiO_2$) and alumina ($Al_2O_3$) and other similar silicon and aluminum compounds that can react with calcium oxide or calcium hydroxide in the presence of water and hydrate or cure to a hardened, cementitious state. The third group of calcium compounds that can contribute to cementitious hardening (and can also sometimes slow hardening) are the calcium sulfates. These may be in the anhydrite (i.e., unhydrated) form or in the hydrated forms such as calcium sulfate dihydrate (gypsum) and calcium sulfate hemihydrate (plaster of paris). Reactions and hydrations of still other compounds may also occur within the powder when water is added and may contribute to hardening of the powder. Hardening of wetted ash powder may also occur simply as a result of what appears to be mere drying.

Any particular fly ash composite powder may be characterized by the length of its hardening or set up period, which is measured from the time when the ash powder is first mixed or brought into contact with water until the time when the powder as a whole hardens or cures to a cementitious state. In the hardened or cementitious state, the ash powder is in an essentially non-flowable and generally cohesive form, which may exhibit only minimal resistance to being broken up or fractured by hand, or may exhibit a greater degree of cohesiveness similar to that of plaster of paris. In composite ash powders suitable for practice of the invention, this hardening period is not less than about 2 (or not less than about 3) hours after the powder is mixed with water (e.g., an equal weight quantity of water). This period permits sufficient time for handling and spreading of the composition after mixing and prior to set up. The powder of the prime example set forth below, for example, does not exhibit a hardening or set up earlier than about 6–8 hours after the ash powder and water mixture is left relatively undisturbed following the initial mixing of powder and water. Suitable powders also are those that have a much longer set up period (e.g., not less than 6 or 8 or 12 hours) after they are mixed with an equal weight quantity of water.

Interestingly, calcium sulfate, when present as anhydrite or gypsum in dry portland cement powder in levels up to 6 percent or more by weight, moderates or slows down the overall curing rate of the portland cement powder for a longer set up period when the cement is mixed with water. The anhydrite and gypsum compounds present or formed in wetted fly ash powder are believed to have a similar moderating effect on the curing rate of the portland cement-type and calcium-pozzolan compounds in the powder.

The level of sulfur as compared to calcium also may affect the set up time. Powders having a calcium to sulfur weight ratio of less than or not over about 5 appear to give preferred performance—slow curing or set up periods—for practicing the invention. It may be possible that a powder having a calcium to sulfur ratio lower than about 5 is more likely to have a greater amount of its calcium contained in the slower curing calcium sulfate compound than powders having a higher calcium to sulfur ratio.

The fly ash composite powder for practice of the invention will also include one or more liming agents, which are molecular constituents or compounds in the composite powder that tend to increase the pH (i.e., decrease the acidity) of soil with which they are mixed. Molecular constituents which may be found in the powder such as the oxides, hydroxides, and carbonates of calcium, magnesium, potassium, and sodium, have the ability to act as soil pH-raising liming agents. The most common agricultural liming agents contain some form of calcium, such as quicklime (calcium oxide), hydrated or slaked lime (calcium hydroxide), ground limestone (calcium carbonate), and even gypsum (calcium sulfate). Reacted and unreacted desulfurization residue in the powder will often contain one or more of these calcium compounds (e.g., calcium sulfate, calcium oxide).

The measure of a particular soil amendment's potential ability to raise the pH of an amended soil is made in reference to the liming ability of a pure calcium carbonate soil amendment. The "calcium carbonate equivalence" (CCE) of a soil amendment composite powder is represented by the ratio of the composition's potential liming ability to that of calcium carbonate. For example, the powder of the prime example set forth below has a CCE of 41.3 or about 40 percent. Therefore, for this particular powder to have a pH-raising effect on soil equal to essentially pure calcium carbonate, this powder would have to be applied at a rate about two and one-half times the application rate of pure calcium carbonate per acre. A CCE of at least about 20 (e.g., 20 percent of the pH-raising power of pure calcium carbonate) is about the lowest for useful ash powders in practicing the invention. Powders with a CCE much lower than 20 must be applied in such large quantities for effective soil amendment that it becomes overly burdensome for land application and can add higher than acceptable levels of potentially toxic elements (e.g., minor elements such as boron) to the amended soil. Preferred ash powder for practicing the invention should exhibit a CCE of at least 30 percent or even at least 40 percent.

Another measure of potential pH-raising ability is "effective neutralizing power" (ENP), which considers the size or fineness of a soil amendment's particles as well as its percent CCE. Finer particles have more effective neutralizing power per unit weight than larger particles. This ENP may be calculated using the following formula:

$$\% ENP = \% TNP \times FI \times \% \text{ Dry Matter}$$

where % TNP (Total Neutralizing Power)=% CCE and FI (Fineness Index)=

0.2×(% weight of particles passing through an 8-mesh sieve but remaining on a 20-mesh sieve)

+0.6×(% weight of particles passing through a 20-mesh sieve but remaining on a 60-mesh sieve)

+1.0×(% weight of particles passing through a 60-mesh sieve)

For example, the composite ash powder of the prime example set out below has a percent CCE of 40, and its percent TNP also is 40. Its particles all pass through a 60-mesh sieve, and since the powder is essentially 100 percent dry matter, its percent ENP equals 40, the same as its percent CCE.

The elemental composition of composite fly ash powder can vary greatly in concentration from one ash source to another. Nevertheless, experts studying coal ashes have established that there are certain constituent elements in fly ash that are typically present at higher weight concentration levels (e.g., typically above about 1 percent weight). The group of major elements usually includes aluminum, calcium, iron, magnesium, potassium, silicon, sodium and sulfur. Elements in the fly ash that generally have lower concentrations in coal fly ash (e.g., typically less than about 1 percent weight) are often classified as minor elements.

Table 1 lists selected major constituent elements and a percent weight range for each constituent in fly ash powder. The ranges are based upon data reported in several coal ash studies and were compiled by S. V. Mattigod, D. Rai, L. E. Eary, and C. C. Ainsworth in the article "Geochemical Factors Controlling the Mobilization of Inorganic Constituents from Fossil Fuel Combustion Residues: I. Review of the Major Elements," which was published in volume 19 of the *Journal of Environmental Quality*, at page 191 in 1990, here incorporated by reference.

Note that in Table 1 the range of percent weights for each constituent represents a percentage of the total weight of the ash sample, which includes the weight of elements that are not listed in Table 1. These ranges should be regarded as approximations as they were compiled from reported data without regard to differences between the various studies as to the type or source of the coal burned, the combustion processes employed, the particular method used to determine the concentration of each ash constituent, or other factors that could influence the percent weight reported for each constituent.

TABLE 1

| Major Constituent | Concentration Range (in weight percent) |
| --- | --- |
| Al (Aluminum) | 0.10–20.85 |
| Ca (Calcium) | 0.11–22.30 |
| Fe (Iron) | 1.00–27.56 |
| K (Potassium) | 0.17–6.72 |
| Mg (Magnesium) | 0.04–7.72 |
| Na (Sodium) | 0.01–7.10 |
| S (Sulfur) | 0.04–6.44 |
| Si (Silicon) | 1.02–31.78 |

Composite coal fly ash powders containing desulfurization residue, as may be used for this invention, may contain major element concentrations of rather wide range, even beyond the limits of Table 1, but will always have at least about 8 percent calcium by weight. Usually the silicon concentration will reach at least about 3 percent by weight, the aluminum at least about 2 percent by weight, and the sulfur at least about 1 percent by weight in ashes most useful in practicing the invention. While our invention is not to be limited to Minnesota ash, we do here in Table 2 give weight percent ranges for major constituents in Minnesota-generated fly ashes containing desulfurization residue. These weight ranges embrace results from two different methods used for determining weight percent. One method was the direct current plasma (DCP) emission spectroscopy method. In conducting the DCP method, samples of ash are fused with lithium metaborate, dissolved in HCl and citric acid, and then analyzed by DCP. This method usually provides complete dissolution of the sample, and therefore concentrations or weight percentages should represent the element's total concentration within the sample. The other method was the inductively coupled plasma (ICP) emission spectroscopy method. In ICP, the ash samples were digested in teflon pressure bombs using a concentrated $HNO_3$-$HClO_4$ solution in a microwave oven. This method did not produce complete digestion of the sample and left small amounts of silica as the majority of the residue. The DCP method is considered more accurate and reliable for determining the weight percent of most elements (but it does not give a good reading for the content of boron in an ash).

TABLE 2

| Major Constituent (Minnesota) | Concentration Range (in weight percent) |
| --- | --- |
| Al (Aluminum) | 4–8 |
| Ca (Calcium) | 10–20 |
| Fe (Iron) | 1–7 |
| K (Potassium) | 0.2–2 |
| Mg (Magnesium) | 1–4 |

TABLE 2-continued

| Major Constituent (Minnesota) | Concentration Range (in weight percent) |
|---|---|
| Na (Sodium) | 0.5–2 |
| S (Sulfur) | 1–7 |
| Si (Silicon) | 5–12 |

Table 3 below sets forth the approximate weight percentages and parts by weight for major and minor element concentrations in a prime example of a composite powder (exhibiting a CCE of about 40) very useful for practice of this invention. (The entry "BD" signifies that the level of the element was below the detection threshold level of the analysis method, while "ND" signifies that the level was not determined.)

TABLE 3

| Constituent | Units | Concentration DCP | ICP |
|---|---|---|---|
| Al (Aluminum) | % wt | 4.48 | 6.56 |
| As (Arsenic) | ppm | ND | 8.14 |
| B (Boron) | % wt | ND | 0.09 |
| Ba (Barium) | % wt | 0.29 | 0.067 |
| Be (Beryllium) | ppm | 2.80 | BD |
| Ca (Calcium) | % wt | 13.59 | 18.54 |
| Cd (Cadmium) | ppm | ND | 1.83 |
| Co (Cobalt) | ppm | 16.0 | BD |
| Cr (Chromium) | ppm | 57.0 | 35.36 |
| Cu (Copper) | ppm | 61.4 | 58.30 |
| Fe (Iron) | % wt | 1.51 | 1.36 |
| K (Potassium) | % wt | 0.48 | 0.34 |
| Li (Lithium) | ppm | ND | 78.62 |
| Mg (Magnesium) | % wt | 1.15 | 1.63 |
| Mn (Manganese) | ppm | 469.06 | 477.34 |
| Mo (Molybdenum) | ppm | ND | 7.11 |
| Na (Sodium) | % wt | 1.02 | 1.02 |
| Ni (Nickel) | ppm | 27.70 | 13.60 |
| P (Phosphorus) | % wt | 0.11 | 0.17 |
| Pb (Lead) | ppm | 128.0 | 20.17 |
| S (Sulfur) | % wt | ND | 6.23 |
| Sc (Scandium) | ppm | 13.6 | ND |
| Si (Silicon) | % wt | 6.75 | 0.23 |
| Sr (Strontium) | % wt | 0.37 | 0.28 |
| Th (Thorium) | ppm | 701.0 | ND |
| Ti (Titanium) | % wt | 0.22 | 0.18 |
| V (Vanadium) | ppm | 63.0 | 62.62 |
| Zn (Zinc) | ppm | 42.0 | 36.23 |

(The level of some insignificant or minor constituents in the ash of Table 3 was determined by special methods. For example, the level of selenium, determined by hydride generation atomic absorption, was 2.8 ppm. The level of mercury, determined by cold vapor generation in conjunction with gold amalgamation and atomic absorption, was 0.02 ppm.)

Evident from Table 3 is the fact that many minor elements are in the ash powder at extremely low concentrations, each normally not present in an amount over 1 percent by weight and usually present at a much lower concentration, if present at all. The group of minor elements that are most often present, but at extremely low concentration, includes arsenic, boron, barium, cadmium, chromium, copper, mercury, manganese, molybdenum, nickel, lead, selenium, vanadium, and zinc.

Table 4 lists these most common minor constituent elements and a weight range (in parts per million) for each constituent—all in a weight maximum well below 1 percent. (A 1.0 weight percent presence equals 10,000 parts per million.) The ranges are based upon data reported in several coal ash studies and were compiled by L. E. Eary, D. Rai, S. V. Mattigod, and C. C. Ainsworth in the article, "Geochemical Factors Controlling the Mobilization of Inorganic Constituents from Fossil Fuel Combustion Residues: II. Review of the Minor Elements," which was published in vol. 19 of the *Journal of Environmental Quality*, on page 203 in 1990. These ranges should be considered approximations in the same manner as noted for the ranges for major elements in Table 1.

TABLE 4

| Minor Constituent | Concentration Range (in ppm) |
|---|---|
| As (Arsenic) | 2–440 |
| B (Boron) | 10–5000 |
| Ba (Barium) | 1–13800 |
| Cd (Cadmium) | 0.1–130 |
| Cr (Chromium) | 4–900 |
| Cu (Copper) | 33–2200 |
| Hg (Mercury) | 0.01–12 |
| Mn (Manganese) | 25–3000 |
| Mo (Molybdenum) | 1–140 |
| Ni (Nickel) | 2–4300 |
| Pb (Lead) | 3–2100 |
| Se (Selenium) | 0.2–130 |
| Sr (Strontium) | 30–7600 |
| V (Vanadium) | 12–1180 |
| Zn (Zinc) | 14–3500 |

The major and minor elements in the fly ash powder may include essential nutrient elements in plant-available form (e.g., a form that the plant will take up or absorb through its roots) such that mixing the composite powder with a soil will add these nutrients to the soil and make them available to plants or crops to be grown in the soil. Macronutrients, or those nutrient elements needed by plants in relatively higher amounts, include carbon, oxygen, nitrogen, phosphorus, potassium, calcium, magnesium, and sulfur. For example, a plant-available form of sulfur is the sulfate ion (e.g., $SO_4^{2-}$). Micronutrients, or nutrient elements needed by plants in smaller or trace amounts, include iron, zinc, manganese, copper, boron, molybdenum, silicon, sodium, cobalt, and vanadium.

Table 5 gives the detailed analyses of two more fly ashes containing desulfurization residue. Example 2 tested to a calcium carbonate equivalence of 40.3, and Example 3 tested to 45.7 as its CCE.

TABLE 5

| Constituent | Units | Example 2 DCP | Example 2 ICP | Example 3 DCP | Example 3 ICP |
|---|---|---|---|---|---|
| Al (Aluminum) | % wt | 4.17 | 5.90 | 4.54 | 7.24 |
| As (Arsenic) | ppm | ND | BD | ND | 4.12 |
| B (Boron) | % wt | ND | 0.06 | ND | 0.096 |
| Ba (Barium) | % wt | 0.59 | 0.11 | 0.77 | 0.13 |
| Be (Beryllium) | ppm | 3.7 | 2.24 | 4.6 | 2.37 |
| Ca (Calcium) | % wt | 12.97 | 18.07 | 14.20 | 18.94 |
| Cd (Cadmium) | ppm | ND | 4.33 | ND | 5.30 |
| Co (Cobalt) | ppm | 39.0 | 4.95 | 39.0 | BD |
| Cr (Chromium) | ppm | 82.0 | 47.89 | 96.0 | 72.62 |
| Cu (Copper) | ppm | 189.0 | 174.22 | 236.0 | 305.83 |
| Fe (Iron) | % wt | 3.13 | 3.26 | 2.76 | 3.34 |
| K (Potassium) | % wt | 0.37 | 0.26 | 0.30 | 0.25 |
| Li (Lithium) | ppm | ND | 67.01 | ND | 34.54 |
| Mg (Magnesium) | % wt | 1.71 | 2.65 | 2.31 | 3.46 |
| Mn (Manganese) | ppm | 303.51 | 348.35 | 101.97 | 112.48 |
| Mo (Molybdenum) | ppm | ND | 3.34 | ND | 7.396 |
| Na (Sodium) | % wt | 0.70 | 0.83 | 1.38 | 1.53 |
| Ni (Nickel) | ppm | 76.0 | 59.92 | 55.40 | 57.73 |
| P (Phosphorus) | % wt | 0.25 | 0.26 | 0.30 | 0.27 |

TABLE 5-continued

| Constituent | Units | Example 2 | | Example 3 | |
|---|---|---|---|---|---|
| | | DCP | ICP | DCP | ICP |
| Pb (Lead) | ppm | 123.0 | 14.95 | 125.0 | 39.83 |
| S (Sulfur) | % wt | ND | 3.49 | ND | 2.33 |
| Sc (Scandium) | ppm | 24.20 | ND | 28.50 | ND |
| Si (Silicon) | % wt | 7.54 | 0.22 | 5.18 | 0.19 |
| Sr (Strontium) | % wt | 0.35 | 0.28 | 0.35 | 0.27 |
| Th (Thorium) | ppm | 706.0 | 0.09 | 717.0 | ND |
| Ti (Titanium) | % wt | 0.40 | ND | 0.51 | 0.11 |
| V (Vanadium) | ppm | 173.0 | 185.51 | 252.0 | 220.25 |
| Zn (Zinc) | ppm | 94.0 | 88.86 | 188.0 | 187.25 |

The physical form of the composite coal combustion powder (fly ash with desulfurization residue) is believed to be generally spherical, with diameters generally in the range of between 0.01 and 100 microns, although some particles may be larger up to about 250 microns or even up to about (but smaller than) 2 mm. The powders generally have at least 75 percent or so of the weight of their particles no larger than about 100 microns. Most particles are no larger than 80 microns, and typical powders sometimes are said to have most of the weight thereof accounted for by particles in the range of between about 20 and 80 microns. The particulate size distribution of fly ash powder is often non-uniform and may have at least about 20 percent by weight of their particles in sizes even smaller than 20 microns, down to 2 microns or less. Illustratively, the fly ash powder of the prime example appears uniformly whitish with a texture very similar to that of baking flour or cosmetic face powder.

Applying such a fine, dusty powder to the surface of the soil has been stymied by the susceptibility of the powder to the problem of "fugitive dust." Fugitive dust is the term applied to ash powder particles that escape from the larger group or bulk of particles. The dust is usually comprised of small ash powder particles that have been wind driven or carried from their place of initial application or placement on a soil surface.

3. PREPARATION AND APPLICATION OF THE SOIL AMENDMENT

Preparation of the composite powder for soil application or spreading commences with the mixing of the powder with water to produce a composition in a slurry form. The mixing most preferably occurs at or near the site of the agricultural soil to be amended, with the ash powder and water components being transported to the site separately. However, mixing at a central site and transporting the mixture over varied distances to an application site may be suitable, but the transport should be limited to up to about 50 or possibly about 75 miles, and limited to a time period within two or three hours (possibly up to 4 or 6 hours where the cementitious tendency is slow) after initial start of mixing the ash in water.

The mixing is accomplished by adding the powder to water in an enclosed mixing tank (i.e., one covered as in drawing but not necessarily having all access openings hermetically sealed). (Adding water to powder creates unnecessary problems and requires excessive energy.) The powder to water ratio should be about 10 parts by weight of powder to between about 8 and 20 parts by weight of water, preferably between about 8 and 15 or 12 parts by weight of water, and most preferably about one part powder to one part water. The amount of water in a particular batch should be sufficient to suspend the powder and create a slurry that has a consistency for spreading by liquid application machinery. Higher water ratios make for easier mixing but increase the bulk that must be applied to each acre of soil.

The mixing tank employed should have a capacity of at least about 2,000 U.S. gallons for practical agricultural field treatment according to the invention. Preferably the tank should have a capacity of at least about 5,000 or even 6,000 gallons. Such higher capacity tanks permit formation of batches of the powder and water mixture containing at least about 8 or 10 dry tons (e.g., 20,000 pounds) of the composite powder, which makes for the most efficient mixing and field utilization of the mixture. Most ideally, the introduction of the powder and water components into the mixing vessel is continuously metered and is performed substantially simultaneously with each other (or with water slightly advanced as compared to the metering of powder), which permits the fastest reliable introduction of the components into the mixing tank. Introducing the water into the mixing tank at an advanced timing as compared to the powder can advantageously permit quicker and more effective and efficient mixing. Introducing all or most of the batch quantity of the water into the mixing tank first and then subsequently adding the powder also produces satisfactory results.

Figure 1:
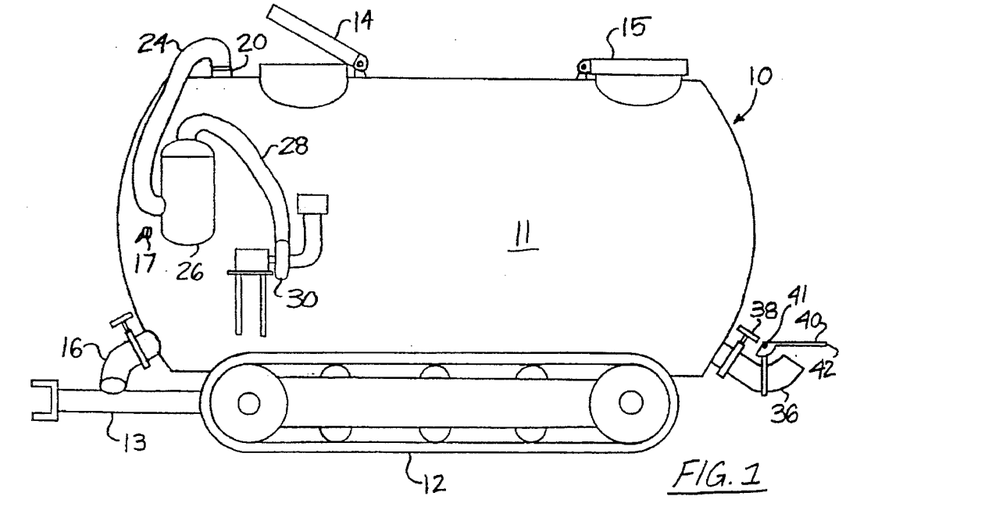
FIG. 1 is a schematic side view of a combined mixing tank and land spreading vehicle suitable for use in conducting the method of the invention.
Figure 2:
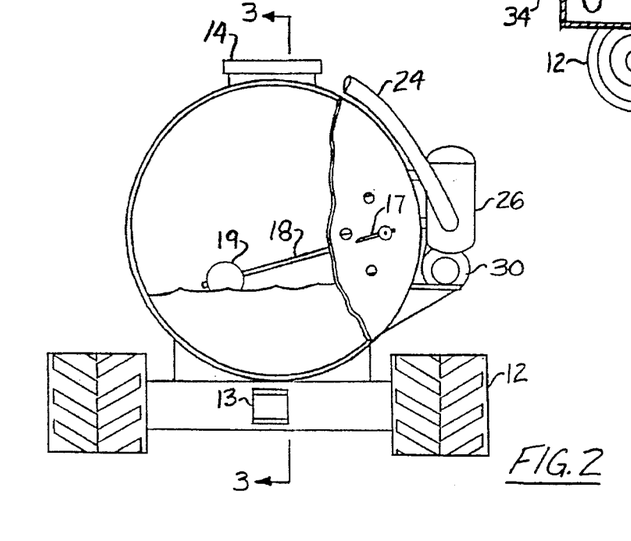
FIG. 2 is a schematic front end view of the vehicle shown in FIG. 1 with portions broken away to show inside detail.
Figure 3:
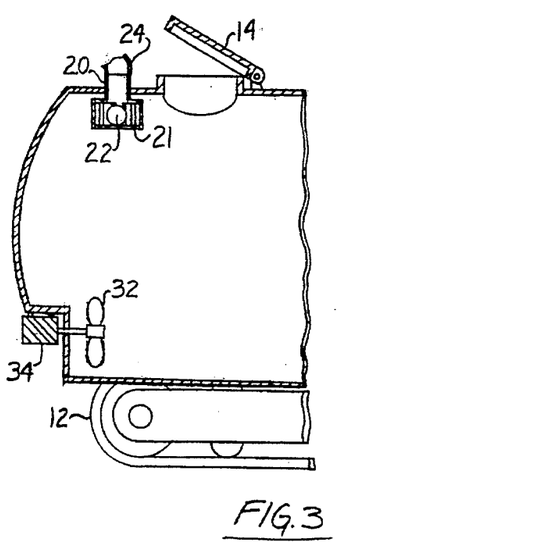
FIG. 3 is a schematic side sectional view of the vehicle taken along line 3—3 of FIG. 2, with parts broken away.
Figure 4:
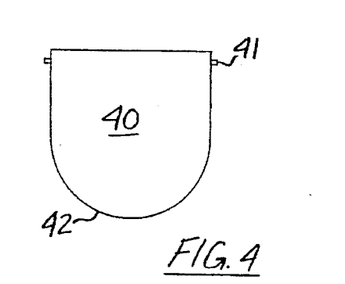
FIG. 4 is a schematic top view of a splash plate for the vehicle shown in FIG. 1.

A preferable apparatus for mixing the water and powder components together is a vehicle 10 (see FIGS. 1, 2, and 3) that uniquely combines mixing apparatus and land application or spreading apparatus in a single piece of equipment. Use of the vehicle 10 in practice of the invention eliminates the need to transfer the mixture between mixing and spreading apparatus and saves time and energy that would be necessary to do so. (However, mixing the slurry components in a dedicated mixing tank or vessel and then transferring the slurry to a liquid-spreading apparatus is also suitable for practice of the invention.) The vehicle 10 has an enclosed tank 11 in which mixing of the large tonnage quantities of the components may be performed. The capacity of the preferred tank is about 6,000 gallons, but tanks having a capacity of 7,000 gallons or more may be suitable for mixing and spreading. The vehicle 10 is supported on endless tracks 12 (e.g., Caterpillar tracks) or on floatation tires, and may be towed behind a tractor or other power equipment using towing tongue 13. The vehicle 10 (with loaded 6,000-gallon tank 11) exerts through tracks 12 less than about 2 pounds of weight per square inch on the soil such that when it is pulled over a field during land spreading operations, soil compaction by the vehicle 10 is minimal and significantly less than the compaction produced by a conventional farm tractor. (Similar avoidance of soil compaction results when floatation tires are employed.) This is significant because over-the-road wheeled trucks of water and ash on agricultural soil tend to compact it and unduly to the point where extra working of the soil at varied depths even below 6 inches may be needed to loosen it for crops.

The ash powder and water components may be introduced into the tank 11 through upper hatches 14, 15 using, for example, an auger or screw conveyor in a conduit or pipe for feeding the powder into one hatch and using a pump and a hose for feeding the water into the other. Instead of an auger or screw, the powder can be usefully introduced in the tank 11 through a conduit where it is conveyed by air movement. Continuous metering of the water and powder introduction may be performed using appropriate metering equipment or by simply timing the feed or flow of components through equipment, such as a pump or conduit for ash, having known feed or flow rates. A level indicator 17 (see FIG. 2), which is moved by arm 18 on which a float 19 is mounted, gives a general indication of the level of tank 11 contents. If desired, the water (or even a previously prepared slurry mixture) may be drawn or sucked into the tank 11 through filler inlet 16 by applying a negative pressure or vacuum to the interior of the tank 11.

A preferred feature of the vehicle 10 is a system for generating positive or negative pressure inside tank 11. A fitting 20 defines a port on and out of tank 11 (and for this embodiment, the tank should be capable of being hermetically sealed). The fitting has a cage (see FIG. 3) over its opening to the tank's interior. The cage 21 houses a float ball 22 that will float on the surface of liquid in the tank and plug the opening or port through fitting 20 when the tank 11 is full. A first connector hose 24 (see FIG. 1) connects the fitting 20 to a trap 26, which catches and filters out any liquid or solids that might in small amounts be sucked into the first hose 24. A second connecting hose 28 connects the trap 26 to a reversible air pump 30. This pump is capable of creating a vacuum or reduced pressure in the interior of the tank 11 by pumping air out of it or pressurizing the interior of tank 11 by pumping air into it.

The amount of mixing necessary to achieve a satisfactory slurry composition having a substantially uniform distribution of the discrete powder particles in the water will vary depending upon various factors such as the particular tonnage quantities in the batch to be mixed, the particular ratio of powder to water in the batch, the manner in which the powder and water are introduced into the mixing tank, and the mixing power available for moving or impelling the components of the composition within the mixing tank. However, thorough mixing of the powder and water for uniformity will almost always require at least about 5 minutes of substantially continuous mixing (timed from the start of adding powder to water), and may take longer (e.g., 30 or 40 minutes) for batches of higher tonnage quantity (e.g., 10 tons of powder in a tank of capacity of at least 5,000 gallons U.S. standard) as well as those batches having a relatively higher powder content. It should be noted that placing the powder and water components into the mixing tank will by itself produce some degree of mixing, and mixing or agitation by mechanical means may begin and continue as the components are being loaded into the tank. Significantly, adding the ash powder to water at a relatively slow rate while the water is being agitated may produce a substantially uniform mixture without requiring further agitation or mixing after the last of the batch quantity of powder has been added. Thus the adding and mixing steps may be performed substantially simultaneously.

The mixed composition should be of a uniform consistency that will easily flow under the force of gravity alone through a vertical pipe of about 2-inch or even 1-inch (inside diameter). For example, a composition incorporating the powder of the prime example in about a 1:1 weight ratio with water appears off-white or light beige in color and initially has a consistency somewhat thicker than milk, but thinner than gravy. It easily flows by gravity through a 1-inch vertical pipe.

Continuous or regularly intermittent agitation of the composition (after the initial mixing for achieving uniformity) can extend the period in which the composition remains in a slurry form that is flowable and spreadable by spray liquid application.

The mixing tank 11 has a propeller blade 32 (see FIG. 3) in its interior for mixing and moving the ash powder and water around inside the tank. The propeller blade 32 is mounted relatively low in the interior of the tank and is driven, for example, by a hydraulically powered motor 34. The blade 32 may be used to perform the initial mixing for uniformity and also for subsequent agitation of the slurry after initial mixing to reduce settling of the ash powder out of the mixture and to delay the composition's set up.

The treatment composition may be applied or spread on the surface of the agricultural soil to be amended using land spreading equipment designed for spreading relatively liquid compositions. The spreading of the composition in this manner must be accomplished before the composition has hardened to a substantially cementitious state where it will no longer flow through the spreading apparatus. The hardening or set up time exhibited by a particular composition may be affected by the specific composition of the powder, and additional agitation performed on the slurry mixture, and may in some cases be extended by the addition of more water to the composition after the initial mixing (if set up has not progressed so far as to prevent additional mixing). Adjustment of these factors may extend the period in which the slurry remains flowable for spreading up to possibly 6 hours (maybe even longer such as 10 hours) from the time the powder is added to the water.

The composition is applied to the surface of the soil at a quantity that is sufficient to raise the soil water pH to a level of at least about 6.5, but preferably not above pH 7.5. To achieve a uniform pH rise in the soil, the composition should be applied uniformly over the surface of the soil in a coating that has a substantially uniform thickness. The quantity of composition applied to each acre (or the application rate) will depend primarily on the particular pH requirements of the soil to be amended (e.g., the acidity of the soil determined by soil tests) and the pH-raising power (e.g., the CCE) of the particular powder of the treatment composition. For most soils, a slurry application rate should be such that at least about 5 tons up to about 20 tons of the composite powder is applied per acre. The amount should be sufficient to raise the soil-water pH above 6.5. An application rate of between about 7 and 12 (or about 10) tons of powder per acre is the most common for amendment of the soil.

For example, a treatment composition comprised of the ash powder of the prime example and an equal weight quantity of water may be applied to agricultural soil at a rate of about 10 tons of (dry) ash powder (i.e., 20 tons or 40,000 pounds of the composition) per acre. Since this particular ash powder has a density roughly equal to that of water, a 20-ton batch of the composition has roughly the same volume as 20 tons of water, or about 4,800 gallons. Thus, a vehicle 10 having a tank 11 capacity of about 5,000 gallons or more is ideally suited for mixing and spreading a sufficient quantity of the composition for an acre of soil.

The composition applied at the preferred quantities on each acre should form a substantially uniform coating or layer that does not exceed a thickness of about 6 or 7 millimeters. A minimal application rate of the whitish composition produces a thin layer on the soil that may resemble a whitewash coating, while higher application rates result in a layer that may resemble a thick coating of plaster. The composition may be applied on a field of plowed soil or even on an unplowed field that may have crop or plant stubble on the soil surface.

The preferred liquid spreading apparatus on vehicle 10 includes an inverted pipe 36 mounted at the rear of the enclosed tank 11 (with an integral valve 38). The pipe 36 empties the slurry composition from tank 11 at a bottom location and directs the slurry liquid exiting it in an upward direction. A splash plate 40 (see FIGS. 1 and 4) with a semicircular rear edge 42 is pivotally mounted on a pin 41 above the exit opening of pipe 36 such that it may be pivoted into the path of a stream exiting the pipe 36. When the valve 38 is opened, the exiting liquid soil treatment composition strikes upwardly on the splash plate 40 and is splashed or deflected radially outward from the plate (e.g., laterally and rearwardly) in a semicircular arc about the rear of the vehicle 10 and falls on the surface of the soil in a substantially uniform coating. The maximum diameter or width of spray application is about 50 feet (and to achieve this, the slurry treatment composition is pressurized for discharge through pipe 36). The minimum useful width of slurry application is about 6 feet, with a width of about 12 to about 25 feet being the most practical. The interior of the vessel or tank 11 may suitably be pressurized by pump 30 up to about 5 or 10 or 15 or 20 (e.g., between 5 and 15, or about 12) pounds per square inch to produce a more consistent flow through the pipe 36 as the tank 11 is gradually emptied. (Pressurized discharge, however, is not always required.) The land application of the slurry treatment composition using this splashing technique and apparatus is surprisingly quick for spreading tonnage quantities of the slurry mixture. For example, spreading 20 tons of the composition (about 5,000 gallons) on an acre of soil in about 5 minutes is possible. (Optionally, the splashing may be accomplished by directing a stream downwardly on a lower splash plate.)

The application rate of the composition per acre may be increased or decreased by varying factors such as the pressure inside the tank, the angle of the splash plate with respect to the pipe opening, and the speed at which the spreading vehicle 10 is towed over the soil. Overlapping one spreader application pass over a previously applied area is useful.

While the quantity of the treatment composition to be applied to agricultural soil is primarily dependent upon achieving the pH requirements for plant growth, the quantity that may actually be applied on some agricultural fields may be limited by elements or components (such as boron) that are potentially toxic to plants or animals. If application of the powder in a particular treatment slurry composition to a particular soil at the proper pH-raising quantity per acre would result in the amended soil having a potentially toxic level of such an element, the application rate may have to be adjusted downward from the otherwise optimal pH-raising quantity per acre to avoid creating a potentially toxic condition for plant growth in the amended soil. For example, the application rate may have to be decreased so that the application and incorporation of the composition into the soil does not elevate the plant-available boron in the soil above about 25 pounds per acre (or some greater reduced level).

Federal and state agencies may impose limits upon the amounts of certain elements, such as heavy metals, that may be applied to agricultural soil. Illustratively, listed below are the federal Environmental Protection Agency (EPA) limits and the Minnesota Pollution Control (MPCA) limits on the amounts (in pounds per acre) of certain elements that may be applied to soil through a soil amendment incorporating sewage sludge. (No formal specific limits have been established for soil amendments using coal fly ash insofar as is known, but the limits specified below are useful as a guide for coal ash application.)

| Constituent | MPCA Limit (lbs./acre) | EPA Limit (lbs./acre) |
| --- | --- | --- |
| Zinc | 500 | 2,492 |
| Copper | 250 | 1,335 |
| Nickel | 100 | 374 |
| Lead | 1,000 | 267 |
| Cadmium | 10 | 35 |
| Chromium | — | 2,670 |
| Arsenic | — | 36 |
| Molybdenum | — | 16 |
| Selenium | — | 89 |
| Mercury | — | 15 |

Once a coating of the treatment composition has been applied to the surface of the soil, the soil should be worked sufficiently to distribute the composition in a substantially uniform or even distribution throughout the top portion of the soil, that is, from the soil surface down to a depth of no more than about 9 inches below the surface. The depth of the top portion should be at least 3 or 4 inches, usually about 6 inches, but no more than about 9 inches, as the term "top portion" is used in the context of this invention. Within this soil depth range, the composition is most effective for elevating the pH of the soil in the root area or zone for potential or future cultivated crops and for making the nutrient elements (e.g., calcium) in the treatment composition available to the plant root structures. For example, calcium in the composition will not readily move through the soil, so it must be placed in the root zone to have a nutrient benefit.

The working of the soil to create the distribution of the treatment composition may be performed while the composition is in a relatively liquid or flowable state (e.g., a slurry) or after the composition has hardened into any cementitious state. Working the composition into the soil within about 48 hours of application but after the composition has substantially hardened to a somewhat brittle and non-flowable condition is preferred. The hardened composition is characterized by being easily broken up into fragments on working the soil when the treatment composition is applied on the soil within the preferred thickness range. The broken-up fragments of the hardened composition may have the appearance of corn flakes breakfast cereal.

Working the soil to distribute the composition applied thereon is most suitably accomplished using conventional plowing or soil mixing equipment, such as chisel plow, disk, or other types of plows or harrows, which have the capability to sufficiently break up the soil surface and crumble the upper layers of the soil and any remaining plant growth residue on the field. The mixing of the soil and the composition should be thorough enough (in the top portion of soil) to avoid creating areas with significantly concentrated levels of the treatment composition. A uniform distribution of the composition in the soil results in a more even pH rise in the soil and makes the nutrients in the composition more available to the potential crops without creating "hot spots" or areas of high concentration levels of potentially toxic elements. For this reason, the use of a moldboard plow is disfavored because of its capability of completely inverting the upper 4 to 6-inch layer of soil and creating a strata of the treatment composition below the surface.

Depending on the source of the coal, the fly ash composite powders used in forming treatment compositions for application to agricultural soil will contain varying amounts of trace elements that, at their very low concentrations, function well to provide plants with essential nutrients, especially essential micronutrients.

Of major benefit is the prevention of the problem of fugitive dust during and after land application of the treatment composition of ash powder. The particles are held in suspension in the wet slurry and thus protected from being windblown. As the composition hardens or sets up, the powder particles are held together in a cohesive mass that is not vulnerable to being picked up by the wind and that does not release powder particles as fugitive dust before or after the treatment composition is worked or incorporated into the soil. Thus the hardening of the ash powders that was thought to be a disadvantage to land application techniques is converted by the practice of the invention into a beneficial feature solving the problem of fugitive dust.

The utilization of an apparatus with which both mixing and land spreading of the slurry treatment composition may be performed, such as the vehicle 10, is especially beneficial in that time is saved by not needing to transfer the slurry from a mixing vessel to a land spreading apparatus. Not only does use of vehicle 10 make the invention more time efficient, less energy (e.g., less agitation of the slurry) is necessary to keep the treatment composition in a uniform slurry consistency and put it on the agricultural soil without creating unwanted soil compaction problems that would have to be corrected.

Those skilled in the art will readily recognize that this invention may be embodied in still other specific forms than illustrated without departing from the spirit or essential characteristics of it. The illustrated embodiments are therefore to be considered in all respects illustrative and not restrictive, the scope of the invention being indicated by the appended claims rather than the foregoing description, and all variations that come within the meaning and range of equivalency of the claims are therefore intended to be embraced thereby.

That which is claimed is:

1. A method of agricultural field utilization of tonnage quantities of a composite powder of coal combustion fly ash containing desulfurization residue to amend agricultural soil of the type having a soil-water pH below 6.5 in a manner that prevents the escape of fugitive dust from the powder and effectively manages any cementitious tendencies of the powder, comprising:

(i) providing said composite powder as a product wherein said desulfurization residue includes at least one of the group consisting of calcium sulfate and hydrates of calcium sulfate, wherein calcium compounds and any compounds of silicon and aluminum as present in the composite powder do not cause a mixture of the powder with an equal weight quantity of water to harden to a cementitious state earlier than about 2 hours after the powder is mixed with the water, wherein said desulfurization residue and one or more of the oxides, hydroxides, and carbonates of elements selected from the group consisting of calcium, magnesium, potassium, and sodium are present in an amount sufficient to cause the composite powder to exhibit a calcium carbonate equivalent liming potential greater than 20, and wherein plant nutrient elements including boron in addition to sulfur and calcium are present at least in part in a form available for plant uptake, (ii) adding said powder to water in an enclosed mixing tank having a capacity of at least about 2,000 gallons, said powder being added at a ratio of about 10 parts by weight of said powder to between about 8 and 20 parts by weight of said water, (iii) mixing said powder and water together in said mixing tank for a time in excess of about 5 minutes as said powder is added to said water, said mixing being sufficient to produce a substantially uniform distribution of said powder as discrete particulate in the water so as to form a soil treatment composition in slurry form having a consistency easily flowable through a vertical pipe of about 1-inch diameter, (iv) applying said treatment composition on the surface of the agricultural soil to be amended before said composition hardens to a cementitious state, said application being accomplished so as to provide a substantially uniform coating of said composition on the soil at a thickness no greater than about 7 millimeters thick, said composition being applied at a quantity such that each acre is covered with composition containing at least about 5 tons of said composite powder up to about 20 tons of said composite powder, said quantity being sufficient to amend the top portion of said agricultural soil that supports plant growth, from the surface thereof down to a depth of at least 4 inches but no more than about 9 inches, to elevate the pH of said top portion above about 6.5 and insufficient to elevate the total plant-available boron content in the said top portion above about 25 pounds per acre, and (v) thereafter working the soil sufficiently to distribute said applied treatment composition substantially uniformly throughout said top portion so that said composition effectively is made available for elevating the pH of said top portion and so that plant nutrient elements contained in said composition are substantially uniformly distributed in said top portion, said working of the soil being accomplished at any time following application of said treatment composition on the soil, whether before or after said composition on the soil hardens to any cementitious state, any said hardened cementitious state of said composition as a layer on soil being characterized by the fact that the layer is easily broken up into fragments by working the soil.

2. The method of claim 1 wherein application of said treatment composition on the surface of the soil comprises splashing said treatment composition on the surface of the soil.

3. The method of claim 1 wherein said treatment composition is applied on the surface of the agricultural soil by splashing a stream of said treatment composition against a splash plate.

4. The method of claim 1 wherein said application of said treatment composition on the surface of the soil comprises passing said treatment composition through a discharge pipe that directs said treatment composition against a splash plate.

5. The method of claim 1 additionally including the step of moving said mixing tank over the surface of the agricultural soil to be amended while simultaneously applying said treatment composition directly from said mixing tank onto the surface of the agricultural soil.

6. The method of claim 1 wherein application of said treatment composition on the surface of the agricultural soil comprises discharging said treatment composition under pressure from said mixing tank as said mixing tank is moved over the surface of the agricultural soil.

7. The method of claim 1 wherein said mixing tank is mounted on means permitting movement of said mixing tank over the surface of the agricultural soil to be amended, and wherein said treatment composition is applied on the surface of said agricultural soil from said mixing tank without transfer of said treatment composition to other equipment after said mixing of it.

8. The method of claim 1 wherein said treatment composition is applied by discharge of it onto the surface of the agricultural soil to be amended at a rate faster than about 10 tons per half hour.

9. The method of claim 1 wherein said treatment composition is applied on the surface of agricultural soil to be amended within about 1 hour after starting the step of adding said powder to water in said mixing tank.

10. The method of claim 1 wherein said treatment composition is applied on the surface of agricultural soil after being transported no more than about 75 miles from the site where said composite powder was added to water in said mixing tank.

11. The method of claim 1 wherein said powder is added to water at a weight ratio of about 1 part of said powder to about 1 part of water.

12. The method of claim 1 wherein said addition of said powder to water takes place as water is introduced into said mixing tank.

13. The method of claim 1 wherein said composite powder is added to said water by conveying said composite powder in a conduit.

14. The method of claim 13 wherein air is used to convey said powder.

15. The method of claim 13 wherein an auger is used to convey said powder.

16. The method of claim 1 wherein said mixing is accomplished in said mixing tank by rotating a propeller blade in said mixing tank.

17. The method of claim 1 wherein said mixing in said mixing tank is terminated after about 40 minutes from the start of said mixing.

18. The method of claim 1 additionally comprising the step of agitating said composition beyond said mixing step to delay any tendency of said composition to harden to a cementitious state.

19. The method of claim 1 additionally comprising the step of adding additional water to said composition after completion of said mixing in order to delay any tendency of said composition to harden to a cementitious state.

20. The method of claim 1 wherein said working step is performed after the treatment composition on the soil has hardened to a cementitious state.

21. The method of claim 1 wherein said working step is performed using a chisel plow.

22. The method of claim 1 wherein said composite powder is provided to include at least one of the group contributing to cement formation consisting of tricalcium silicate, dicalcium silicate, tricalcium aluminate, and tetracalcium aluminoferrite.

23. The method of claim 1 wherein said composite powder is characterized by having a sulfur constituent content and calcium constituent content such that the weight ratio of calcium to sulfur is no greater than about 5:1.

* * * * *